United States Patent [19]

Petersen et al.

[11] 4,387,298

[45] Jun. 7, 1983

[54] RECOGNITION LOGIC CIRCUIT FOR BAR CODE READER SYSTEMS

[75] Inventors: David J. Petersen, Hatboro; Paul E. Tartar, Chester; Robert S. Bradshaw, Broomall, all of Pa.

[73] Assignee: Burroughs Corporation, Detroit, Mich.

[21] Appl. No.: 325,546

[22] Filed: Nov. 27, 1981

[51] Int. Cl.³ .............................................. G06K 7/10
[52] U.S. Cl. .................................. 235/462; 235/463; 235/454
[58] Field of Search ...................... 235/462, 463, 454; 340/146.3 Z

[56] References Cited

U.S. PATENT DOCUMENTS 3,701,097  10/1972  Wolff .............................. 235/463 X

*Primary Examiner*—Harold I. Pitts
*Attorney, Agent, or Firm*—Francis A. Varallo; M. L. Young; E. M. Chung

[57] ABSTRACT

An electronic recognition circuit is described for use in bar code reader systems having postal and commercial applications. Such systems may be required to read codes which are of relatively poor print quality. The present circuit utilizes statistical auto-correlation techniques to reject extraneous ink dots and minor print voids commonly associated with such printing. Additionally, the circuit is skew tolerant and both position and velocity independent of the bar code being processed.

11 Claims, 8 Drawing Figures

RECOGNITION LOGIC CIRCUIT FOR BAR CODE READER SYSTEMS

BACKGROUND OF THE INVENTION

As the volume of letter mail becomes increasingly heavy, more attention is being directed to optical reading systems to assist in the handling thereof. For example, an escort code consisting of a plurality of bars and half bars, arranged to provide desired information, may be applied to the faces of the respective documents at different stages of their processing. The code may provide ZIP information needed for interim sorting to route the mail pieces to their destination city or postal station. Also, the code may be used to provide sort information to the carrier, firm, post office box or building—direct level. Optical code readers additionally have significance to large mailers for implementing pre-sorting requirements.

A convenient, economical manner of applying the bar code to the document being processed is through the use of an ink jet printer. In such printing, the particles of ink are sprayed onto the surface to be marked, and generally do not result in the monolithic, precisely formed bars achieved with other printing methods, such as lithography. Optical reading systems exist which operate satisfactorily with bar codes of the last mentioned type, but produce erroneous results when detecting code of relatively poor quality provided by ink jet methods. Obviously, what is optimally required is a cost effective reader system which can accurately recognize bar code generated by both processes.

The recognition circuit of the present invention fills such a need. It enables the optical reader system in which it is used, to reject extraneous ink dots and to ignore minor print voids. It is also skew tolerant and independent of the position and velocity of the bars being detected.

SUMMARY OF THE INVENTION

In accordance with the present invention an electronic circuit is provided for use in an optical reader system for detecting code of the bar/half-bar type.

In an actual operative optical reader system employing the recognition circuit of the invention, the bar code is detected by scanning its image which is projected onto a solid state image sensor array. The bar code is scanned while the document is in motion, using a suitable illumination and optics system. The array scan rate and resolution are such as to provide an adequate amount of bar code detail to the recognition circuit of the reader. The output of the array of sensor scanning elements is a serial analog signal train which is converted into levels of black and white in a digital format usuable by the recognition circuit.

The logic implemented by the circuit of the present invention utilizes statistical auto-correlation techniques to better distinguish valid bar code signals from various random discrepancies in the bar appearance and position. The circuit includes a minimum pulse width filter or discriminator for rejecting extraneous ink dots in the stream of signals derived from the sensor scanning elements. A dual threshold dark area correlation detector is provided which operates on two successive scans of the pulse streams. The correlation scheme ignores minor print voids in the printing of the bars and the use of two scans in the detection process renders the correlation detector skew tolerant as well as permitting to reject single scan ink splashes. The circuit of the present invention further provides a bar length calculation to determine whether the bar being scanned is long or short in accordance with the bar/half-bar code employed in the system. Finally, the circuit responds to the transition of black to white on a single scan, that is, where the document transport has moved a white area onto the field of view of the scanner array elements, and provides for the output transfer of a signal indicative of the logical value of the bar length in accordance with the preceding bar length calculation.

Other features and advantages of the invention will become more fully apparent in the detailed description which follows.

DESCRIPTION OF THE PREFERRED EMBODIMENT

Figure 1:
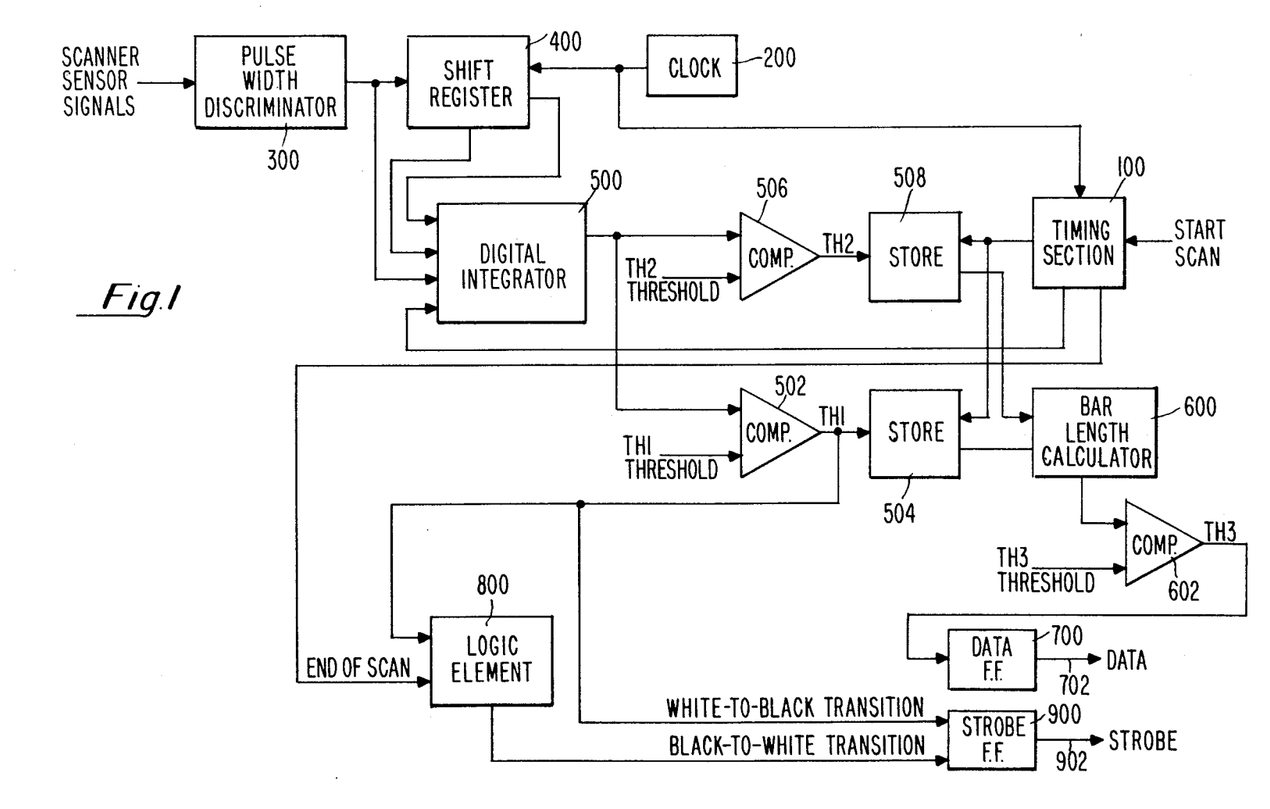
FIG. 1 is a simplified block diagram of the recognition logic circuit of the present invention.

A simplified block diagram of the recognition circuit of the present invention appears in FIG. 1. With reference to the last mentioned figure, a TIMING SECTION 100 under control of CLOCK source 200 is provided. The TIMING SECTION includes a 6-bit binary counter, providing a count of sixty-four. The counter is used to control the alignment of the scanner sensor signals for two successive scans. Synchronization of the counter with the optical scanner (not shown) in the reader system is accomplished with a "start scan" signal, derived from the latter. As will be described in detail hereinafter in connection with the schematic diagram of FIG. 2, the counter of TIMING SECTION 100 provides positional information relative to the scan itself, at decision points for calculations.

The stream of 64 scanner sensor signals derived from the optical scanner in a single scan of the bar, is applied serially to a PULSE WIDTH DISCRIMINATOR or filter 300. The function of the latter is to reject isolated one clock period width signal pulses which may correspond to extraneous ink dots. Signal pulses greater than one clock period width are passed undistorted through discriminator 300.

The output stream of pulses from the discriminator 300 is stored in a SHIFT REGISTER 400 comprised of a plurality of 8-bit registers and having sufficient capacity to store the 64 pulses corresponding to the 64 elements of the scan sensor array. A pair of shift registers positioned at the beginning and the end of the shift register loop, respectively, provide 7-bit outputs. A DIGITAL INTEGRATOR 500 including a plurality of input logic gates and an up-down counter is provided. The integrator 500 functions as a dark area correlation detector. The stored output of the PULSE WIDTH DISCRIMINATOR 300 is applied to the last mentioned logic gates, which are also coupled to the pair of seven-bit shift registers. Thus, at each shift of the latter registers, the count in the counter assumes a value which is the total of the number of pulses present in both registers. The count may vary from 0, for all white, to a maximum of 14. The latter value represents an all black area on each of the two successive scans.

The value of this integration is representative of the autocorrelation coefficient of the stream of scanner sensor signals. Detection is performed by constantly comparing this value to a threshold, which in the present instance was arbitrarily chosen as one greater than half the maximum count, that is 8. This assures detection of signals with a minimum correlation coefficient of 8/14 or 0.57. A separate end of detection threshold is set two counts less than this value, that is 6, in order to avoid premature completion when minor print voids exist in the printing. The use of two successive scans in the integration process keeps the detector skew tolerant as well as rejecting single scan ink splashes.

When the value in the digital integrator up-down counter exceeds the dark area threshold, it supplies, via comparator 502, a "TH1" signal to storage element 504, which causes the latter to store the scan position furnished thereto at that instant by the counter in TIMING SECTION 100. At the end of the detection of the black bar area, the integrator 500 supplies, via comparator 506, a "TH2" signal to storage element 508 to cause it to store the instant scan position applied to it by the TIMING SECTION 100. So long as the start of the black area occurs closer to the beginning of each scan, the new position is stored in element 504. Similarly, if the start of the white area occurs further away from the start of the scan, the position data in element 508 is updated. Otherwise, the data in elements 504 and 508, remains unchanged. The positional information in elements 504 and 508 respectively, is applied to a BAR CODE LENGTH CALCULATOR 600 which performs a subtraction of the position data stored in element 504 from that stored in element 508. This provides an absolute length of the detected bar without regard to its position in the scanner field of view. The updating of position information in storage elements 504 and 508 continues for every scan, if necessary under the conditions noted hereinbefore, until an all white scan occurs. The bar length from the calculator 600 is compared in comparator 602 with a predetermined threshold to determine whether the distance between the start and stop of the black area is long enough to declare the bar as being "long", defined as a logical "1", or short enough to be declared "short", or a logical "0". The output of comparator 602, designated "TH3" is stored in the DATA FLIP-FLOP 700, at the end of each scan.

Finally, output transfer logic comprised of LOGIC ELEMENT 800 representing for sake of simplicity, a plurality of flip-flops and gates in a subcircuit, and STROBE FLIP-FLOP 900. As long as the scanner is viewing black bars, a detection will occur each scan. As the transport conveying the article bearing the bar code moves a white area onto the scanner field of view, the DIGITAL INTEGRATOR 500 will no longer accumulate a value in excess of the detection threshold. The state of the DATA FLIP-FLOP 700 is updated for each black to white transition that occurs after the detection of each black bar. Moreover, the STROBE FLIP-FLOP 900 which had previously been switched to one of its stable states by "TH1", at the white to black transition, is now returned to the opposite state at the black to white transition through the action of LOGIC ELEMENT 800 and the END OF SCAN pulse applied thereto. The strobe line 902 which is assumed to be coupled to a device (not shown) provides a level which signals such device to sample the "1" or "0" output on data line 702. The BAR LENGTH CALCULATOR 600 and its associated comparator 602, together with the DATA and STROBE FLIP-FLOPS 700 and 900 respectively, are then returned to their original states. The present circuit is then ready to accomplish another determination when the next black area is found.

Figure 2:
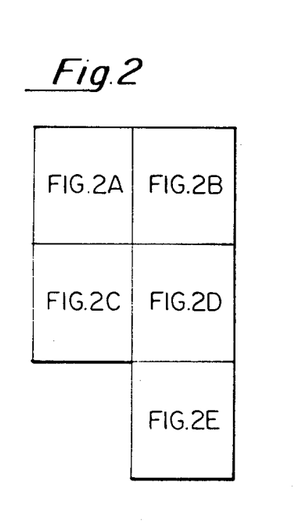
FIG. 2 comprises FIGS. 2A, 2B, 2C, 2D and 2E which together provide a schematic of the recognition logic circuit.
Figure 2A:
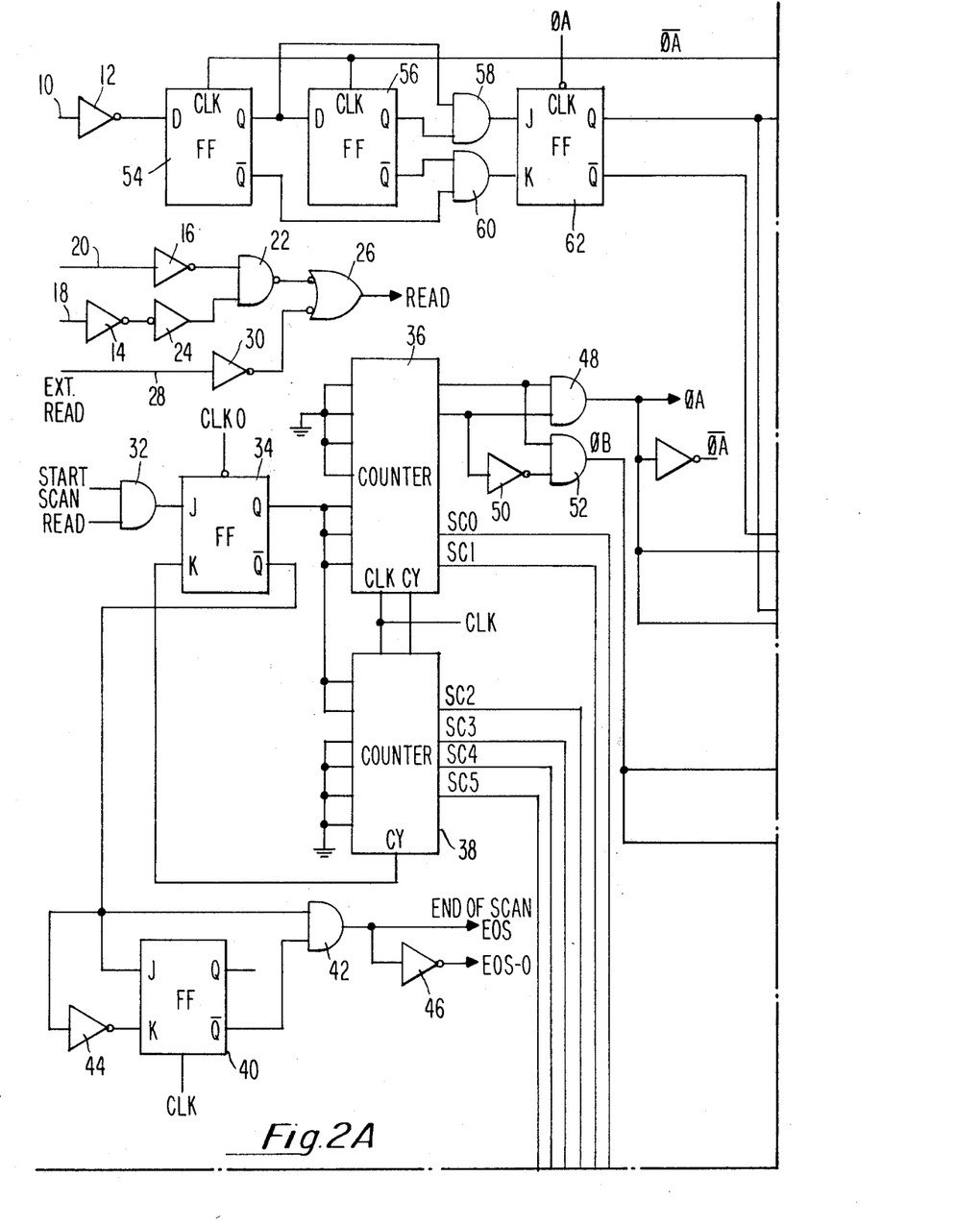
Figure 2B:
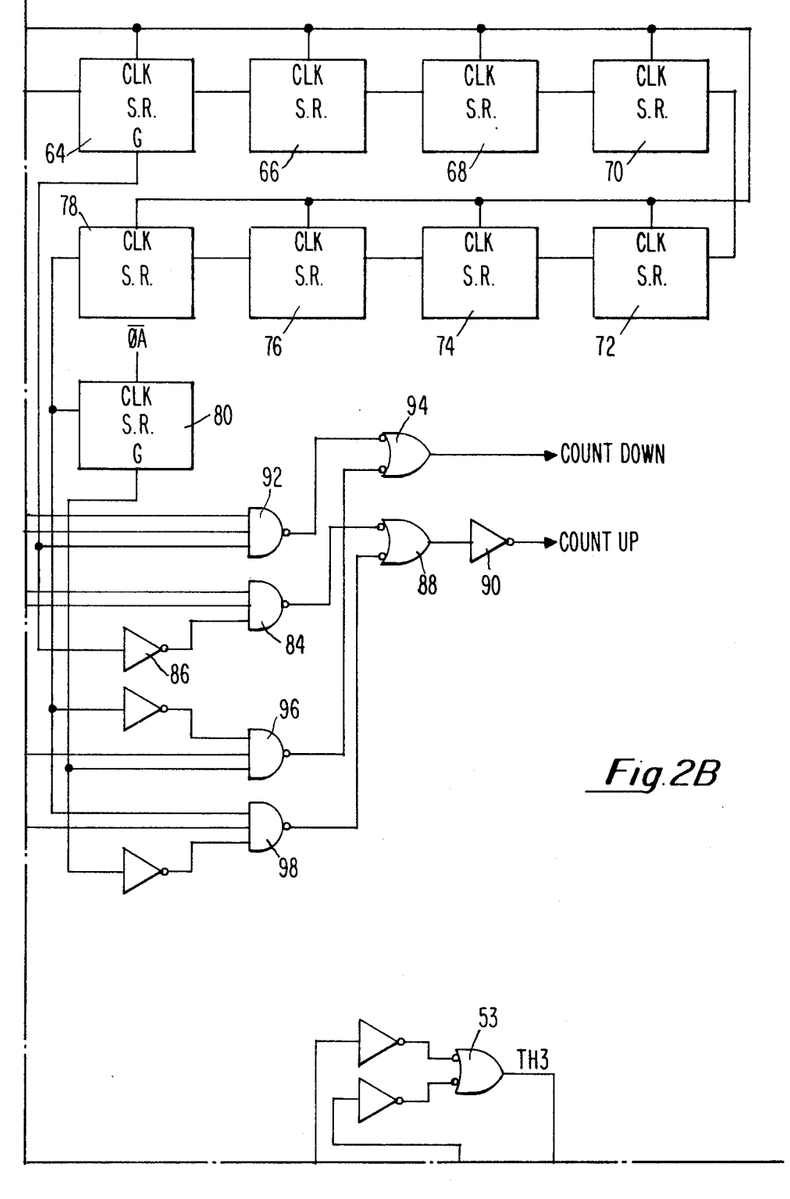
Figure 2C:
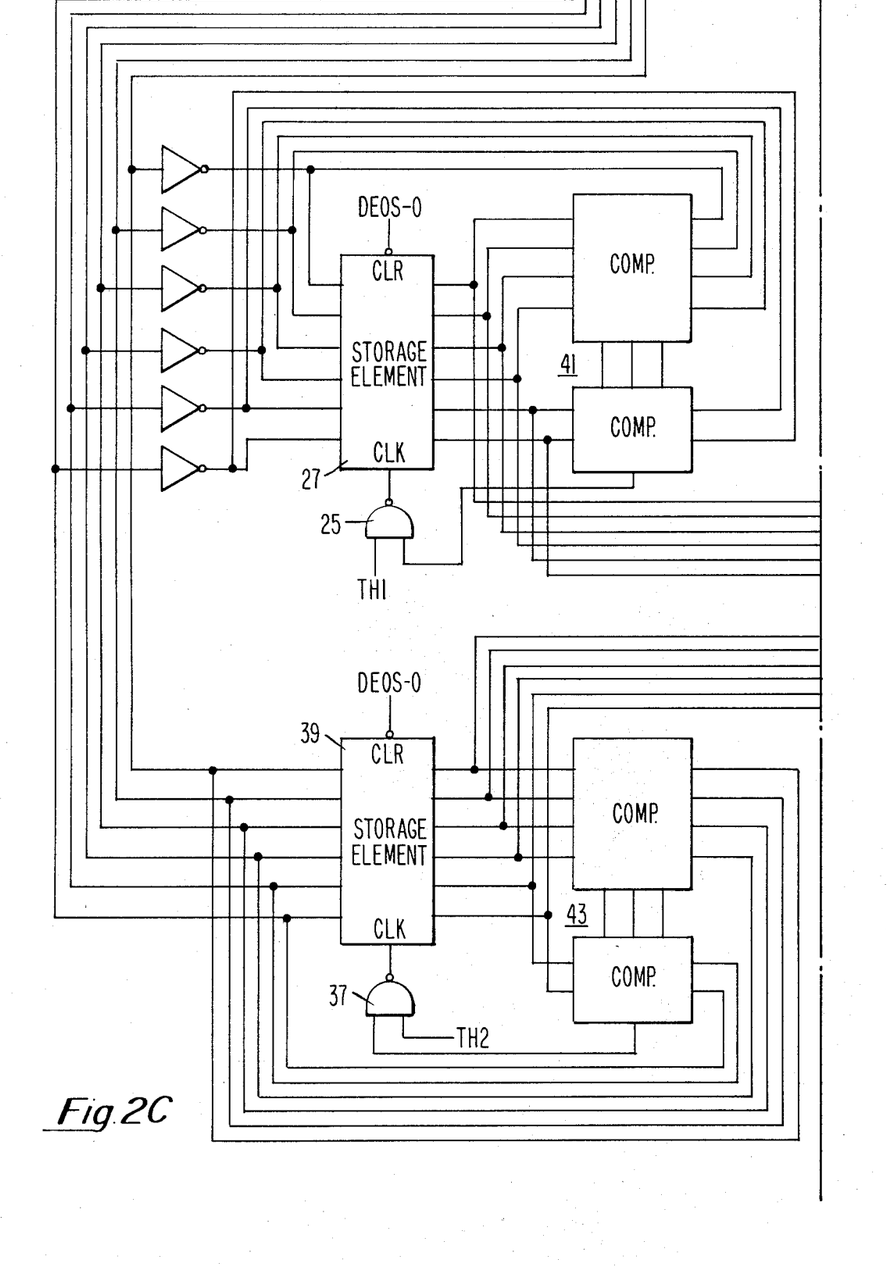
Figure 2D:
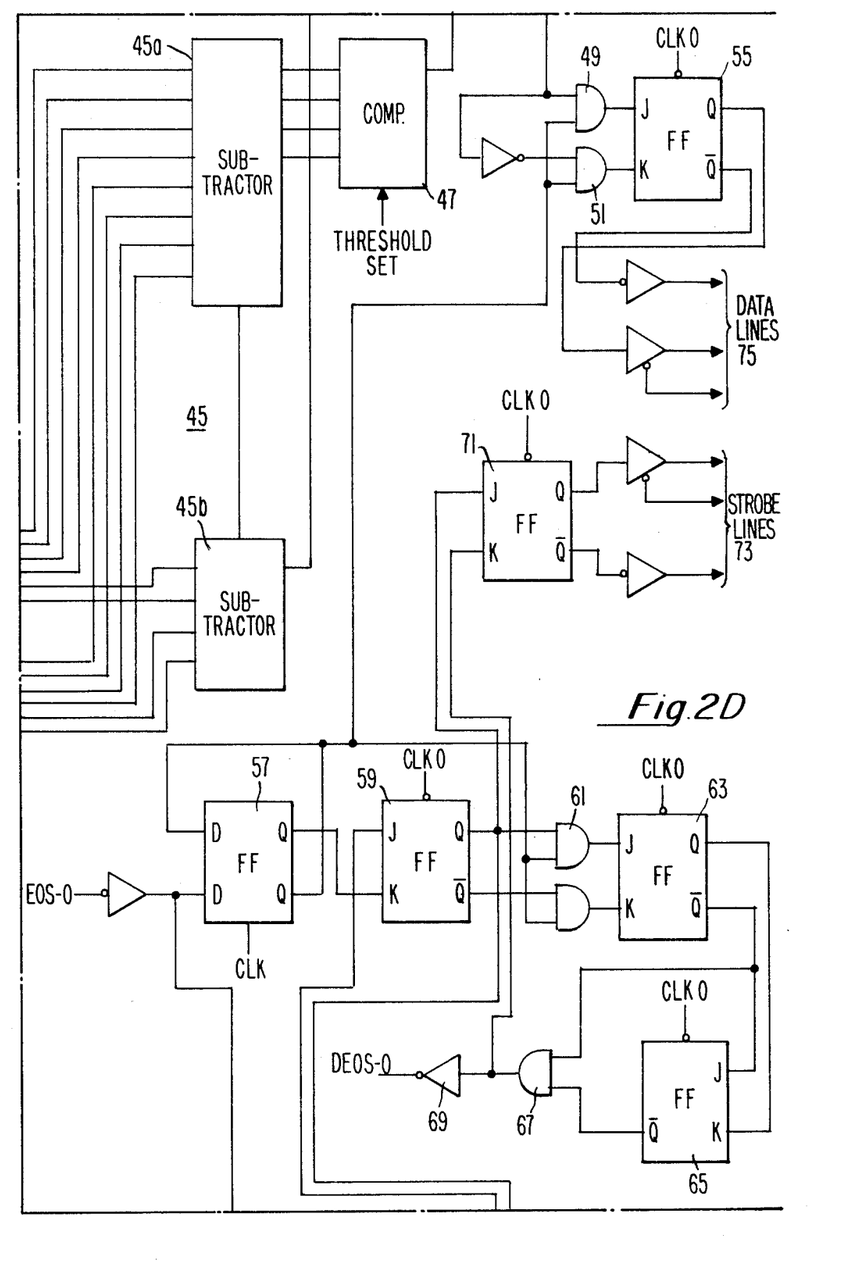
Figure 2E:
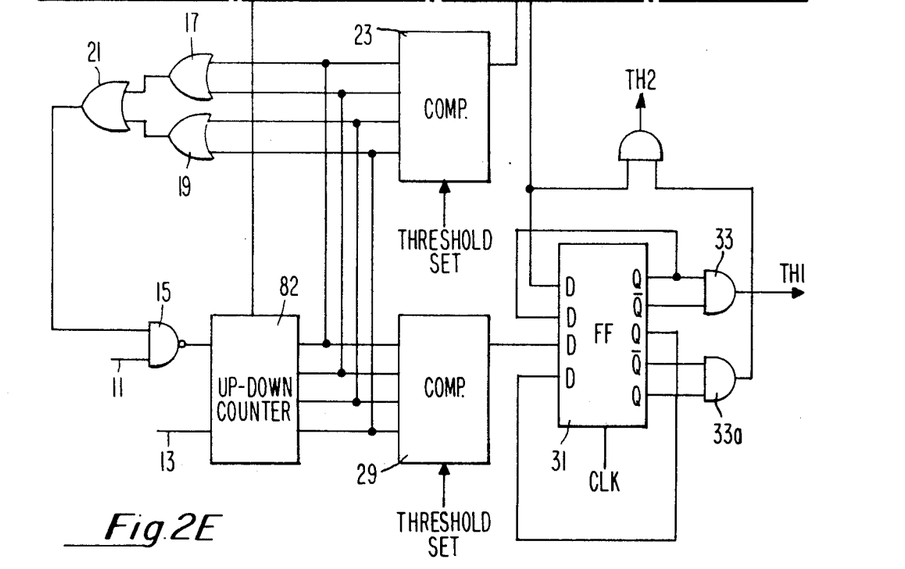

The recognition logic circuit diagrams for use in a reader system employing a bar/half-bar code is shown in FIG. 2. With reference to the latter figure, the input signals appearing on line 10 and applied to the input terminal of inverter 12 are a serial pulse stream of 64 pulses derived from a scanning sensor (not shown) within the reader system. Briefly, the sensor is comprised of 64 light sensitive elements capable of being charged electrically in proportion to the intensity of the light impinging thereon. The charges are stored in associated storage devices such as a serial shift register. At a predetermined time, the shift register is read out, thereby providing the aforementioned pulse stream. Clock pulse CLK and its inversion CLK0, provided from a source, not shown, are utilized in the circuit of FIG. 2.

A TIMING SECTION is provided for the recognition circuit. Inputs to elements 14 and 16 which function as signal conditioners, appear respectively on lines 18 and 20. The latter inputs represent signals signifying respectively that the article bearing a bar code has moved into the field of view of the scanning sensor and that the bars representing the code to be read are considered to be in the proper position to be scanned. The signal on line 20 is gated through gate 16 and is applied to one of the pairs of input terminals of AND gate 22. The other signal is gated through gate 14 and inverter 24 and is applied to the other input terminal of AND gate 22. The output of the last mentioned gate is applied to OR gate 26 which may also receive an external read signal on line 28, via signal conditioner gate 30. In either case, OR gate 26 provides as an output, a READ signal. The READ signal indicates the presence of the article whose bar code is to be read and serves as an enable signal. Thus, the READ signal is applied to one of the pair of input terminals of AND gate 32, and a START SCAN signal derived from scanner control circuits (not shown) is applied to the other input terminal. The output of gate 32 is applied to flip-flop 34 such that the presence of both signals on the input terminals of gate 32, causes flip-flop 34, to switch from a reset state to a set state. In its reset state, flip-flop 34 which has its Q terminal low, is coupled in common to counters 36 and 38, and holds the latter in a "clear" state with zero count. However, upon being switched to its set state, the Q terminal of flip-flop 12 goes high and initiates a count in counters 36 and 38. The outputs of the counter, labeled SC0 through SC5 inclusive, represent in binary form a number from 0 through 64 and provide positional information with respect to the scan of the bar code. That is, at any given time, it is possible to ascertain from the outputs of the counter, the instantaneous position of the moving scan. This is so because counters 36 and 38 are locked in phase with the counter (not shown) actually controlling the scanning, by virtue of the START SCAN pulse applied to gate 32. When the maximum count of 64 has been attained, counter 38 provides on its CY terminal a signal pulse which is coupled to the K (or reset) terminal of flip-flop 34. This causes the latter to return to its RESET state and again holds the counters 36 and 38 in the clear state in preparation for the next scan.

The TIMING SECTION also generates END OF SCAN pulse EOS and its inversion EOS-0 in the following manner. The resetting of flip-flop 34 by a pulse from counter 38, applied to its K terminal, causes the $\overline{Q}$ terminal of flip-flop 34 to go high. Flip-flop 40 and AND gate 42 serve as an edge detector. The voltage level on the $\overline{Q}$ terminal of flip-flop 34 is applied to one of a pair of inputs of AND gate 42, and to the J terminal of flip-flop 40 and via inverter 44 to the K terminal of the last mentioned flip-flop. Prior to the resetting of flip-flop 34, flip-flop 40 is in a reset state with its $\overline{Q}$ terminal high. Therefore, when the $\overline{Q}$ terminal of flip-flop 34 goes high, gate 42 is enabled, allowing a pulse of one clock period width to appear on its output terminal. At the end of one clock period, flip-flop 40 is switched to its set state, causing its $\overline{Q}$ terminal to go low and AND gate 42 to be disabled, terminating its output pulse. An inverting gate 46 coupled to the output terminal of AND gate 42 serves as a buffer, providing on its output terminal END OF SCAN pulses for use in the remainder of the recognition circuit.

For reasons to be considered hereinafter, the counter 36 generates two additional bits as an output. As described hereinbefore, the upper six bits provide positional information outputs, SC0–SC5 inclusive. The additional lowest two bits are used to derive internal phases within the least significant bit, SC0. The lowest bit is available via AND gates 48 and the next lowest bit via inverter 59 and AND gate 52 and are identified as ØA, $\overline{\text{ØA}}$, and ØB, respectively.

The serial pulse stream mentioned hereinbefore is applied via inverter 12, to a PULSE WIDTH DISCRIMINATOR. The latter rejects isolated one clock period width pulses which may correspond to extraneous ink dots. On the other hand, pulses greater than one clock period are considered legitimate and are passed through the discriminator or filter undistorted.

The PULSE WIDTH DISCRIMINATOR is comprised of a pair of D-type flip-flops 54 and 56 and a pair of AND gates 58 and 60. The output of inverter 12 is applied to the D input terminal of flip-flop 54. The setting of flip-flop 54 causes its Q output terminal to go high. The latter terminal is coupled to one of the pair of inputs of AND gate 58. Normally, the latter gate is disabled. At the next clock time, this information stored in flip-flop 54 is transferred to flip-flop 56. If at that clock time, the information on the D-input terminal of flip-flop 54 has disappeared, it can be assumed that it was only one clock period wide. Under this circumstance, as flip-flop 56 was being set, causing a high output level on its Q terminal which would enable AND gate 58, flip-flop 54 is simultaneously reset, with its Q terminal going low and effectively disabling AND gate 58 and presenting an output therefrom. On the other hand, if the information into the D terminal of flip-flop 54 lasts more than one clock period, gate 58 will be enabled, and an output will be produced which is delayed by one clock period. That is, the information is shifted by one clock period. which is the delay through flip-flop 54. The output from gate 58 is applied to the J terminal of flip-flop 62, which stores the information.

The last mentioned delay also applies to the resetting of flip-flop 62 which is accomplished by an output from AND gate 60 applied to the K terminal of the flip-flop. Since gate 60 is not disabled until one clock pulse time later, the true timing width of the information pulse is preserved.

The output of the PULSE WIDTH DISCRIMINATOR and its associated storage element, flip-flop 62 is applied to a DIGITAL INTEGRATOR.

In the present system, the integration occurs over two successive scans of the bar. In order to create storage for the first scan so that it may be used simultaneously with the succeeding scan, a SCAN SHIFT REGISTER is provided comprised of registers 64, 66, 68, 70, 72, 74, 76 and 78. Each of these is an 8-bit register such that a full storage capacity of 64 bits, for the 64 light sensitive elements of the scanning sensor. Through timing control, when the clock is started, 64 pulses representative of the full scan of information are shifted into the register. When the next scan is accomplished, the clock shifts 64 new information pulses into shift register and shifts the 64 prior pulses out via a single 8-bit register 80.

Shift registers 64 and 80 provide the seven bit long inputs to the integrator up-down counter. Seven inputs have been chosen in the present design, although different applications may utilize fewer or greater numbers of inputs. In the present instance, 2 successive scans examine the same 7 positions (representative of 7 scanner elements) in each scan, for a total of 14 scanned areas. That is, assuming that the item being scanned is moving horizontally, at right angles to the scanning sensor, seven vertically contiguous areas in a first scan will be correlated with seven horizontally displaced but adjoining vertically contiguous areas in the second scan.

As noted hereinbefore, integration makes use of a shift register, as a storage element, and an up-down counter. The input to and output from the shift registers 64 and 80 are examined as follows. Considering register 64, information into register 64 is also applied to the input terminal of AND gate 84. An output on terminal G of register 64 is applied via inverter 86 to another input terminal of AND gate 84. A third input terminal of the last mentioned gate is coupled to the ØA clock line from gate 48 on which appears an output derived from counter 36.

If there is a pulse input to register 64, but no output therefrom when the ØA line is high, an output pulse will be generated by gate 84, which will be transmitted via gate 88, through inverter 90. An output from the latter when applied to counter 82, instructs it to "count up". On the other hand, if no information is going into register 64, but information is coming out of terminal G, it will be necessary to subtract from the counter. This is accomplished in AND gate 92 which generates a pulse supplied via gate 94 to the counter 82. The latter tells the counter to "count down". In this manner, the information from a single shift register is used to provide up-count and down-count pulses to counter 82. It should be noted that if there is both an input to and an output from register 64, no change in the count is required. Hence, both gates 84 and 92 are disabled and produce no outputs to counter 82.

In addition to utilizing the output of shift register stage 64 to control counter 82, the output of shift register stage 80 on terminal G is also used for the same purpose. However, it should be noted that while the former output represents the "present" scan, the output of the latter is from the "last" preceding scan. In effect, counter 82 performs the function of two up-down counters through the use of two phase signals, namely ØA from element 48 and ØB from the element 52 in the TIMING SECTION. In ØA, the count in counter 82 is raised, or lowered or unchanged in accordance with the information from shift register stage 64. In ØB, the count in counter 82 is derived from 96 receives signals from the input terminal and the output terminal G of shift register stage 80, and a ØB enable signal from gate 52 in the TIMING SECTION. An output from gate 96 is transferred via gate 94 to counter 82 to cause it to "count down". Similarly, an output from AND gate 98 also coupled to the input and output terminals of shift register stage 80 is transmitted via gate 88 and inverter 90, to cause counter 82 to "count up".

Figure 3:
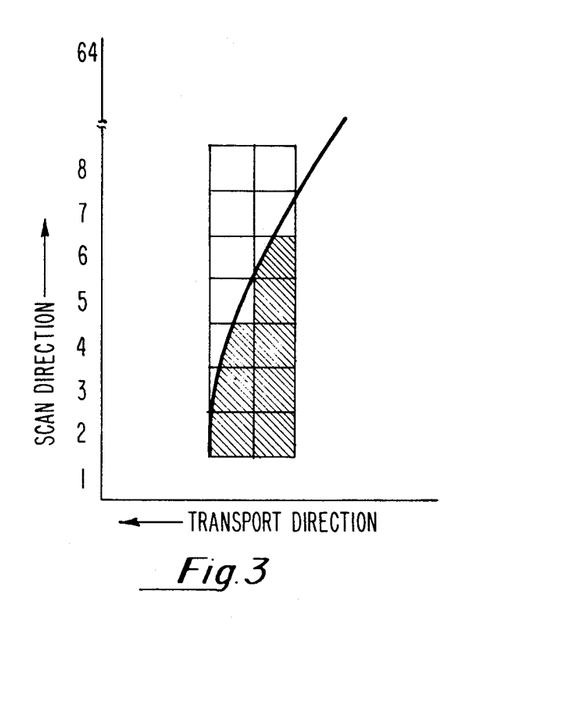
FIG. 3 represents in diagrammatic form, a leading portion of a bar and two successively scanned areas thereof which are utilized in the correlation detector of the recognition circuit.

In utilizing "present" scan and "last" scan information, the scanning of the bar is implemented in two successive scans and because of the selected length of seven sensing elements, the scanning area is 14 elements in total area. Since one clock period represents one sensed area, the use of the two-out-of-phase clock pulses within each sensed area enables two-phase integration, using only one counter 82. In effect, the counter is timed shared, as the entire element is sensed during one clock period by using the two phases of that period. FIG. 3 depicts the 14 element scanning area, with relation to a bar being tested by the recognition circuit.

With reference to FIG. 2, the "count down" pulses from gate 94 and the "count up" pulses from inverter 90 are applied to lines 11 and 13 respectively. The "count up" pulses are applied directly to the appropriate input terminal of counter 82. On the other hand, the "count down" pulses are applied to the counter 82 via AND gate 15 which must be enabled by a signal derived from the count in counter 82. The latter are applied to a pair of OR gates 17 and 19 which in turn drive OR gate 21. The output of the latter is applied to AND gate 15. The purpose of the gating in the "count down" circuit is to prevent the value of the digital integrator, as contained in counter 82, from being counted below zero, and producing a binary number which might erroneously be intrepreted as a maximum value instead of a minimum. Before describing the actual operation of counter 11 and its associated comparators 13 and 15, the correlation philosophy will be considered.

In an actual operative embodiment, the counter 92 is a 4-bit MSI chip. Its capacity is therefore adequate to generate a count of 14, derived in equal measure from the two shift register stages 64 and 80. A count of 14 represents a totally black area in the bar being scanned; a 0 count, a totally white area; and an intermediate count, the presence of a transition region from black to white or white to black. Counter 82 is cleared at the end of every scan by an END OF SCAN pulse applied thereto. The actual value of the count in counter 82 is representative of the autocorrelation of the information. If for example, there are gray areas on the bar being scanned, where black areas are expected to exist, but the overall scan shows mostly black, the total count in counter 82 for the two successive scans will be above seven. For example, in FIG. 3 there are illustrated two successive scans greatly enlarged with respect to the leading portion of a bar. The edge of the bar is shown as being arcuate to demonstrate a poor quality print. The scans yield a total count of 8 for the 14 scanned areas being examined, the former being indicated by cross hatching. A particular transport direction has been illustrated solely for purposes of example. An opposite direction may be required in other applications. Thus, the counter will reflect the condition of over half black area and less than half white area. The measure of "blackness" at any given time is indicative of the autocorrelation of the grouping of black. The technique allows for some white during the scan of the bar, but the count defines the area as black. The white referred to hereinbefore, may be the result of print voids, minor speckles of white, or printing defects generally. The present system is capable of sensing the degree of "blackness", rather than merely "all black" or "all white" conditions. Comparator 23 associated with counter 82, may have a threshold set therein, such that it produces an output when the threshold is attained. For example, in the present case, a threshold of 8 is used. When the count in counter 82 reaches 8, it signifies that since 8 out of 14 scanning elements have received black information, a transition has in fact been made from white to black. The setting of 8 is arbitrary, as a larger number could be set to increase the statistical confidence that the last mentioned transition has occurred. Numbers of 7 or less are not mathematically significant. Use of 8 out of 14, assures a detection of signals with a minimum correlation coefficient of 0.57.

The present system must be informed of the occurrence of the transition from white to black and must know "where" along the scan of 64 elements the transition took place. Thus, the output of comparator 23 produces by means of element 31 which is a multi flip-flop circuit functioning as a pulse edge detector and AND gate 33, via gate 25 to a storage element 27 along with the positional information designated SC0 through SC5 inclusive. Accordingly, the position count at the time of occurrence of the TH1 "load" pulse is stored in element 27.

In addition to determining the position of the scan for a bonafide white to black transition, that is, the presence of the black bar code element has been definitely established, the present system must be informed of the subsequent position of the scan when a black to white transition occurs. That is, a determination must be made when the scan no longer detects a black area. In order to avoid a spurious decision based on just a small decrease in the count coming on a transition from black to white, allowance must be made for minor variations in the count due to minor changes in the levels achieved by the scanner elements. For this reason a separate threshold of a total of six counts is set into comparator 29. This has the effect of insuring that a black to white transition has in fact occurred and that a diminished count is not representative for example, of printing voids in the bar code element. The output of comparator 29 upon attainment of a count of six is applied to element 31. Element 31 drives AND gate 33a which in turn provides an input to AND gate 35. The output of AND gate 35 is a "load" pulse designated TH2. This latter pulse is applied via gate 37 to a second storage element 39, along with the position count of SC0 through SC5 inclusive, and the position corresponding to the occurrence of the TH2 pulse is loaded into storage element 39. In summary, the TH1 "load" pulse loads storage element 27 with the position corresponding to the white to black transition, and the TH2 "load" pulse loads storage element 39 with the position corresponding to the subsequent black to white transition.

In order to derive the length of the bar and thereby establish whether it is long or short in accordance with the code utilized, the "start" and "stop" positions of the black area stored in elements 27 and 39 are examined by comparators 41 and 43 coupled respectively thereto. Thus, comparator 41 compares the start position in storage element 27 with the positional count information which is continually changing. On a present scan, when a new TH1 "load" pulse is generated, the position at which the last mentioned pulse is generated is compared in comparator 41 with that previously stored in element 27 on the last preceding scan. If the position number is less than that previously stored, the TH1 "load" pulse of the present scan is permitted to up-date the position number in element 27. Otherwise, the present scan produces no change in the position information stored in the preceding scan.

In a similar manner, a comparator 43 is coupled to storage element 39, which stores the stop position of the black area in accordance with the TH2 "load" pulse. Comparator 43 is also coupled to the positional information stored in element 39. In a present scan, comparator 43 permits the position number corresponding to the occurrence of the TH2 "load" pulse, to be stored in element 39 if the present number is larger than that. If it is not, no change takes place in the position information stored in element 39. The significance of the foregoing operation is that at any given time, storage element 27 is storing the smallest positional number, that is, the shortest distance to detect the black area measured from the start of the scan. Likewise, storage element 39 is storing the largest positional number, corresponding to the greatest distance the scan must travel from its start, to detect a black to white transition. Obviously, at any given time, the subtraction of the smallest position number from the largest position number yields an absolute measure of the length of the black area.

The last mentioned function is performed by the BAR LENGTH CALCULATOR which is comprised of a subtractor 45, comprising a pair of sections 45a and 45b coupled respectively to storage elements 27 and 39. The results of the subtraction appear on the output terminals of 45a and are applied to the input terminals of a comparator 47. Thus, the inputs to comparator 47 from the subtractor 45 represent at all times the difference between the start and stop posisition of the black bar, which corresponds to the length of the black area. Another input to comparator 47 is the TH3 threshold set level. The latter enables the comparator to distinguish between a long black area and a short black area. At the end of each scan, AND gates 49 and 51 are conditioned to transfer the level on the output of OR gate 53 (derived from comparator 47) to DATA FLIP-FLOP 55. If the black area exceeds the TH3 threshold level, DATA FLIP-FLOP 55 will be placed in the set or "1" state. Conversely, if the black area is less than the threshold the last mentioned flip-flop will remain in the reset or "0" state.

The method employed in the present circuit for determining the black to white transition which occurs after the detection of each black bar is as follows. Element 57 which comprises a pair of D-type flip-flops receives an END OF SCAN pulse on one of its D terminals. Element 59 reclocks the pulse and retimes it and supplies it to AND gates 49 and 51 which drive DATA FLIP-FLOP 55. Element 57 also supplies the last mentioned pulse to flip-flop 59 which keeps track as to whether or not the scan just completed contained any black area information. If the scan had contained black information, flip-flop 59 would be in the set state, and the END OF SCAN pulse resets it. Consider the situation where in a given scan, flip-flop 59 is in the set state as a result of having received a TH1 pulse (indicating a black area detection) on its J input terminal. At the end of the given scan, and before flip-flop 59 is reset, the black area signal output therefrom is transferred via AND gate 61 to flip-flop 63 which assumes the set state. One clock pulse later, the output on the Q terminal of flip-flop 63 is applied to the K or reset terminal of flip-flop 65. Accordingly, at the end of a black area scan, flip-flop 63 is in the set state, and flip-flop 65 is in the reset state. A high level is applied to one of the pair of input terminals of AND gate 67 by flip-flop 65 but since the other input terminal of AND gate 67 is low, because of the state of flip-flop 63, the output of the gate is also low. On the other hand, the output of inverter 69 is high at this time. The signal at the output of inverter 69 provides an END OF WHITE SCAN pulse. The foregoing condition will remain for each scan which contains some black information.

When a given scan contains no black area information, flip-flop 59 has not been set since no TH1 pulse has occurred. At the end of scan time, the reset condition is transferred to flip-flop 63 and, for one clock pulse period, both flip-flops 63 and 65 are in the reset state. AND gate 67 is enabled by the high signals on both of its input terminals, and its output terminal goes from a low to a high level. Also, the output of inverter gate 69 goes from high to low. On the very next clock pulse, flip-flop 65 will be switched to the set state, causing the output of AND gate 67 to go from high to low, and the END OF WHITE SCAN pulse (DEOS-0) at the output of inverter 69 to go from low to high. The result of the foregoing is the generation of pulses out of AND gate 67 and inverter 69 respectively which represent a black to white transition, and which are one clock period in width.

The output of AND gate 67 is applied to the reset terminal of STROBE FLIP-FLOP 71. Thus, a high output from AND gate 67 resets the latter flip-flop and causes its Q output terminal to drop from a high to a low level. It should be recalled that the last mentioned terminal had been high due to the setting of STROBE FLIP-FLOP 71 by a TH1 pulse, signifying the detection of a black area. The output levels on STROBE LINES 73 reflect the reset state of STROBE FLIP-FLOP 71. Such an indication, signals a device external to the present recognition circuit, and connected thereto, to sample the state of the DATA LINES 75, which have output levels determined by the state of DATA FLIP-FLOP 55. The output pulse DEOS-0 from inverter 69 is used to reset storage elements 27 and 39, which were holding the start and stop positions of the black area just passed through. The resetting of the last mentioned elements causes the subtractor 45 and its associated comparator 47 to assume a reset state. The next END OF SCAN pulse applied to DATA FLIP-FLOP 55 via AND gate 51 resets it to the "o" output state. Accordingly the circuit has been cleared of previous information pertaining to the black area just scanned and is ready to start another determination when the next black area is detected.

In conclusion, the recognition logic circuit taught by the present invention has proved highly reliable in an actual operative embodiment. It should be understood that changes and modifications of the circuit organization presented herein may be needed to suit particular requirements. Such changes and modifications as are well known within the skill of the electronics circuit designer, and insofar as they are not departures from the true scope and spirit of the invention are intended to be covered by the following claims.

What is claimed is:

1. In an optical reader system employing a bar/half-bar code, a recognition logic circuit for analyzing the serial pulse streams derived from a scanning sensor disposed within said system for detecting the dark and light areas of the bar indicia, said recognition logic circuit comprising:

timing means including a counter synchronized with the start of a scan of said bar indicia for continually generating output signals indicative of the instantaneous position of said scan relative to its scan length, storage means comprised of a plurality of serially coupled stages having a total storage capacity in excess of that required to store the pulse stream from a single scan, such that predetermined outputs from the first and the last of said stages represent scan data from the present and immediately preceding scans respectively, digital integrator means for providing a bar dark area correlation detection and including gating means and an up-down counter, said gating means being coupled to said predetermined outputs of said first and last stages of said storage means and providing in response thereto input signals to said up-down counter for causing the latter to assume a value which represents the total number of scan pulses present in both said last mentioned stages, said value providing the autocorrelation coefficient of said stream of pulses, integrator comparator means coupled to said up-down counter and having predetermined thresholds set therein, said integrator comparator means generating output signals indicative respectively of the start and end of the detection of a black area of said bar indicia, a pair of storage elements coupled in common to said counter in said timing means and coupled individually to the respective outputs of said integrator comparator means for storing in response to said output signals from the latter, the scan positions corresponding to said start and end of said detection of a black area, means coupled to said pair of storage elements for causing the latter to update the scan position data stored therein whenever the start of the black detection occurs earlier and the end of the black detection occurs later relative to the start of the scan, bar length calculator means coupled to said pair of storage elements for subtracting the scan position data for the start of black detection from that at the end of black detection to obtain a value representative of the absolute length of the bar black area, and means coupled to said bar length calculator for determining, in relation to a set threshold, whether the value of the bar length corresponds to the detection of a bar or half-bar in accordance with the code utilized in the system.

2. A recognition logic circuit as defined in claim 1 wherein said integrator comparator means comprises a pair of integrator comparators, each having a plurality of input terminals connected to the output terminals of said up-down counter, the value of the number stored in said last mentioned counter in two successive scans being representative of the autocorrelation coefficient of said pulse stream, means for setting a first predetermined threshold in one of said pair of integrator comparators to insure detection of scan data pulses with a minimum correlation coefficient, means for setting a second predetermined threshold in the other of said integrator comparators to insure that an end of black area detection has in fact occurred.

3. A recognition logic circuit as defined in claim 2 wherein said means coupled to said pair of storage elements for causing the latter to update the scan potition data stored therein includes a pair of update comparators, each of said update comparators being coupled to both pluralities of input and output terminals of one of said pair of storage elements, a first of said update comparators comparing the scan position information at the start of a black area detection previously stored in a first of said storage elements and appearing on said last mentioned plurality of output terminals with the scan position information appearing on its last mentioned plurality of input terminals corresponding to the start of detection and said black area in a present scan, said first of said update comparators generating an enable pulse whenever the present scan position information indicates an earlier start of black area detection relative to the start of the scan, the second of said update comparators comparing the scan position information at the end of a black area detection previously stored in the second of said storage elements and appearing on its plurality of output terminals with the scan position information appearing on its plurality of input terminals corresponding to the end of detection of said black area in a present scan, said second of said update comparators generating an enable pulse whenever the present scan position information indicates a later end of black detection relative to the start of the scan, a pair of two-input AND gates associated respectively with said storage elements, said enable signals generated by the first and second of said update comparators being applied respectively to an input terminal of the last mentioned AND gates and permitting the output signals generated by said integrator comparator means associated with said up-down counter and applied to the other input terminals of said AND gates to update the scan position information in said storage elements.

4. A recognition logic circuit as defined in claim 3 wherein said bar length calculator means is a subtractor and said means coupled to said bar length calculator means for determining whether the value of the bar length corresponds to the detection of a bar or half-bar is a bar length comparator, said last mentioned comparator having its input terminals connected to the output terminals of said subtractor, a data flip-flop coupled to the output terminal of said bar length comparator, said data flip-flop assuming a set or reset state in response to the output levels of said bar length comparator, which output levels are indicative of the detection of a bar and half-bar respectively.

5. A recognition logic circuit as defined in claim 4 further characterized in that said counter included in said timing means is of the binary type in which said output signals indicative of the scan position are derived from a plurality of bits, said counter generating an additional pair of bits within the least significant bit of said scan position, said pair of bits providing first and second out-of-phase clock signals, said first of said clock signals being applied to and enabling selected ones of said gating means in said digital integrator means for providing present-scan count-up and count-down signals derived from said first stage of said storage means to said up-down counter, said second of said clock signals being applied to and enabling selected ones of said gating means in said digital integrator means for providing last preceding-scan count-up and count-down signals derived from said last stage of said storage means to said up-down counter, said first and second out-of-phase clock signals thereby providing within one system clock period, a two-phase integration within a single area of the bar code indicia sensed by said scanning sensor.

6. A recognition logic circuit as defined in claim 5 wherein said counter in said timing section also provides a signal indicative of the attainment of its maximum count in each scan of said scanning sensor, said last mentioned signal being applied to edge-detection means for generating an END-OF-SCAN pulse.

7. A recognition logic circuit as defined in claim 6 further including a strobe flip-flop, signal means derived from said integrator comparator means for placing said strobe flip-flop in its set state in response to the detection of a black area in each scan, means responsive to the occurrence of a scan in which no black area detection is made for switching said strobe flip-flop to its reset state and thereby establishing a time period during which the state of said data flip-flop may be ascertained.

8. A recognition logic circuit as defined in claim 7 further including a pulse width discriminator interposed between the output pulse stream of said scanning sensor and said storage means, said discriminator rejecting isolated one-clock period width pulses in said stream as corresponding to extraneous black dots and passing legitimate pulses having a width greater than one-clock period.

9. A recognition logic circuit as defined in claim 8 wherein said pulse width discriminator is comprised of first and second D-type flip-flops each having a D input terminal and Q and $\overline{Q}$ output terminals, and first and second AND gates each having a pair of input terminals and an output terminal, clock pulse means coupled to said first and second flip-flops, said pulse stream being applied to said D input terminal of said first flip-flop, the Q terminal of said first flip-flop being connected in common to the D input terminals of said first AND gate, the $\overline{Q}$ terminal of said first flip-flop being connected to one of the input terminals of said second AND gate, the Q and $\overline{Q}$ terminals of said second flip-flop being coupled respectively to the second input terminals of said first and second AND gates, a third JK-type flip-flop having J and K input terminals and Q and $\overline{Q}$ output terminals, the output terminals of said first and second AND gates being connected respectively to said last mentioned J and K input terminals, the Q output terminal of said third JK-type flip-flop being applied to the input terminal of said first stage of said storage means.

10. A recognition logic circuit as defined in claim 9 further characterized in that said gating means included in said digital integrator means is comprised of first, second, third and fourth three-input inverting-output AND gates, a first input of said first and second AND gates being coupled to the first of said out-of-phase clock pulses, a second input of each of said first and second AND gates being coupled respectively to the Q and $\overline{Q}$ terminals of said third JK-type flip-flop associated with said pulse width discriminator, and the third input of said first AND gate being coupled to a predetermined output terminal of said first stage of said storage means, inverter means coupling the third input of said second AND gate to said last mentioned output terminal, a first input of each of said third and fourth AND gates being coupled to the second of said out-of-phase clock pulses, inverter means coupling the second input of said third AND gate to the input terminal of said last stage of said storage means, the second input of said fourth AND gate being coupled to the last mentioned input terminal, the third input of said third AND gate being coupled to a predetermined output terminal of said last stage of said storage means, inverter means coupling the third input of said fourth AND gate to said last mentioned output terminal, a first two-input negated OR gate coupled to the respective output terminals of said first and third three-input AND gates, a signal on the output terminal of said first two-input AND gate providing a count-up pulse to said up-down counter, a second two-input negated OR gate coupled to the respective output terminals of said second and fourth three-input AND gates, inverter means coupled to the output terminal of said second two-input AND gate, a signal on the output terminal of said last mentioned inverter means providing a count-down pulse to said up-down counter.

11. A recognition logic circuit as defined in claim 10 wherein said pulse stream for a single scan is comprised of 64 pulses, said storage means being comprised of nine 8-bit serially connected shift registers, the first and last shift register stages providing on predetermined output terminals 7 bits each for a total possible count of 14 in said up-down counter for a completely black area detection on two successive scans, said first predetermined threshold in one update comparator having a value of 8, thereby setting a minimum correlation coefficient of 0.57, said second predetermined threshold in the other update comparator having a value of 6, thereby avoiding a premature indication of the end of black area detection which might result from print voids in the black area.

* * * * *